United States Patent
Sakata

(10) Patent No.: US 7,328,888 B2
(45) Date of Patent: *Feb. 12, 2008

(54) HYDRAULIC ANTIVIBRATION DEVICE AND HYDRAULIC ANTIVIBRATION ASSEMBLY CONTAINING THE SAME

(75) Inventor: Toshifumi Sakata, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 278 days.

This patent is subject to a terminal disclaimer.

(21) Appl. No.: 10/529,628

(22) PCT Filed: Nov. 24, 2004

(86) PCT No.: PCT/JP2004/017384

§ 371 (c)(1),
(2), (4) Date: Mar. 31, 2005

(65) Prior Publication Data

US 2006/0157902 A1    Jul. 20, 2006

(51) Int. Cl.
*F16F 5/00*    (2006.01)
(52) U.S. Cl. .................. 267/140.13; 267/219
(58) Field of Classification Search ........... 267/140.13, 267/140.14, 140.15, 140.11, 219; 248/562, 248/636
See application file for complete search history.

(56) References Cited

U.S. PATENT DOCUMENTS

| | | | | |
|---|---|---|---|---|
| 4,647,023 A | * | 3/1987 | Ray et al. ..................... | 267/219 |
| 4,711,206 A | | 12/1987 | Andrä et al. | |
| 4,726,573 A | * | 2/1988 | Hamaekers et al. ... | 267/140.13 |
| 4,738,435 A | * | 4/1988 | Flower et al. ......... | 267/140.13 |
| 4,974,818 A | * | 12/1990 | Kato ...................... | 267/140.13 |
| 5,104,100 A | * | 4/1992 | Simuttis ................. | 267/140.13 |
| 5,443,245 A | * | 8/1995 | Bellamy et al. ........ | 267/140.13 |
| 6,311,963 B1 | * | 11/2001 | Suzuki et al. .......... | 267/140.13 |
| 6,422,545 B1 | * | 7/2002 | Baudendistel et al. . | 267/140.13 |
| 6,793,207 B2 | * | 9/2004 | Umemura et al. ..... | 267/140.13 |
| 6,910,683 B2 | * | 6/2005 | Itoh et al. .............. | 267/140.13 |
| 2005/0200060 A1 | * | 9/2005 | Hiraoka ................. | 267/140.13 |

FOREIGN PATENT DOCUMENTS

| | | |
|---|---|---|
| JP | 62-28542 | 2/1987 |
| JP | 64-049731 | 2/1989 |
| JP | 6-221368 | 8/1994 |
| JP | 2003-329079 | 11/2003 |
| JP | 2004-316895 | 11/2004 |

* cited by examiner

*Primary Examiner*—Robert A. Siconolfi
*Assistant Examiner*—Mariano Sy
(74) *Attorney, Agent, or Firm*—Westerman, Hattori, Daniels & Adrian, LLP.

(57) ABSTRACT

There is provided a hydraulic antivibration device and an assembly capable of obtaining a low dynamic spring characteristic upon input of relatively small amplitude vibrations and reducing sufficiently strange sounds. The low dynamic spring characteristic is obtainable by absorption of hydraulic pressure fluctuations between both liquid chambers due to reciprocating displacement of an elastic partition membrane. First and a second attachment fittings are constituted respectively as body frame side coupling means and as vibration generator or engine side coupling means, whereby part of a vibration transmitting path from partitioning means to the body frame can be formed by a vibration-isolating base. Consequently, even when a vibration is generated by impingement of an elastic partition membrane of the partitioning means on plate members, it is possible to suppress securely transmission of the vibration to the body frame by vibration-insulating effect of the vibration-isolating base, thus reducing greatly generation of strange sounds.

7 Claims, 9 Drawing Sheets

HYDRAULIC ANTIVIBRATION DEVICE AND HYDRAULIC ANTIVIBRATION ASSEMBLY CONTAINING THE SAME

TECHNICAL FIELD

This invention relates to a hydraulic (fluid-sealed) antivibration device and a hydraulic antivibration assembly containing the aforesaid hydraulic antivibration device, and more particularly to such a hydraulic antivibration device and an integrated assembly thereof that are capable of reducing sufficiently strange (unusual) sounds or noise while obtaining a low dynamic spring characteristic upon inputting of relatively small amplitude vibrations.

BACKGROUND ART

As an antivibration device for supporting and fixing a vibration generator such as an automotive engine or transmission so as not to transmit its vibration to a vehicle body frame, a hydraulic style antivibration device is well known.

This hydraulic antivibration device is, in general, made up of a first attachment fitting designed to be attached to an engine side and a second attachment fitting to be attached to a vehicle body frame side, wherein both attachment fittings are interconnected by a vibration-isolating base composed of a rubber-like elastomer. At the second attachment fitting a diaphragm is attached, whereby between the diaphragm and the vibration-isolating base there is formed a liquid-filled chamber.

The liquid-filled chamber is divided by a partitioning means into a first liquid chamber and a second liquid chamber, both of which are put into communication with each other through an orifice. According to this hydraulic antivibration device, a fluidization effect of a fluid between the first liquid chamber and the second liquid chamber and a vibration deadening effect of the vibration-isolating base perform a vibration damping function and a vibration insulating function.

There exists another hydraulic antivibration device, such that the partitioning means is constructed of an elastic partition membrane and a pair of displacement-regulating members regulating the displacement amount of the elastic partition membrane from its both sides.

According to the hydraulic antivibration device of this style, when a relatively small amplitude vibration is input, the elastic partition membrane reciprocates to be displaced, thereby absorbing the hydraulic pressure fluctuations between both liquid chambers, whereby a low dynamic spring characteristic is obtainable. On the other hand, when a relatively large amplitude vibration is input, for example, owing to irregular road surfaces upon travelling, the displacement-regulating members serve to regulate the displacement amount of the elastic partition membrane from both sides to raise the stiffness of the membrane thereby to facilitate fluidization of fluid between both liquid chambers through the orifice, so that a high damping characteristic can be obtained.

However, a problem with this style of hydraulic antivibration device was that because of the construction that the elastic partition membrane is struck (made into abutment) on the displacement-regulating members, the displacement-regulating members oscillate at the time of striking, which oscillation is transmitted to the vehicle body frame and results in generation of strange sounds.

To address this problem, for example, the thickness of the membrane is made larger or the hardness of the rubber is made higher, thereby heightening the membrane stiffness of the elastic partition membrane to make it difficult for the elastic partition membrane to do reciprocating displacement, whereby the striking of the membrane on the displacement-regulating members can be precluded to suppress the generation of strange sounds. In this case, however, the elastic partition membrane is difficult to deform, complying with the hydraulic pressure fluctuations between both liquid chambers, so that it becomes difficult to absorb the hydraulic pressure fluctuations and it is unable to obtain a low dynamic spring characteristic.

In the circumstances, heretofore, the contact area of the elastic partition membrane with the displacement-regulating members has been made small by providing the displacement-regulating members with radial ribs, whereby the generation of strange sounds has been suppressed, as disclosed, for example, in JP Patent Publication 6-221368A (Patent Reference 1).

[Patent Reference 1] JP Patent Application Publication 6-221368A (FIG. 4, etc.)

DISCLOSURE OF THE INVENTION

Problems to be Solved by the Invention

With the prior art construction as described above, however, there was a problem in that strange sounds attributed to impingement of the elastic partition membrane on the displacement-regulating members could not sufficiently be reduced. Further problem with the prior art construction was that it was unable to efficiently subject the elastic partition membrane to reciprocating displacement and a sufficient low dynamic spring characteristic could not be obtained.

The present invention has been made to solve the problems stated above, and is aimed at providing a hydraulic antivibration device and a hydraulic antivibration assembly containing the aforesaid hydraulic antivibration device capable of obtaining a low dynamic spring characteristic upon inputting of relatively small amplitude vibrations and sufficiently reducing strange sounds.

Means of Solution of the Problems

In order to achieve the object, the hydraulic antivibration device as set forth in claim 1 comprises a first attachment fitting, a cylindrical second attachment fitting, a vibration-isolating base connecting the second attachment fitting and the first attachment fitting and composed of a rubber-like elastomer material, a diaphragm attached to the second attachment fitting to form a liquid-filled chamber between the diaphragm and the vibration-isolating base, partitioning means comparting the liquid-filled chamber into a first liquid chamber on the vibration-isolating base side and a second liquid chamber on the diaphragm side, and an orifice formed between an outer peripheral face of the partitioning means and an inner peripheral face of the second attachment fitting and putting the first liquid chamber and the second liquid chamber into communication with each other; the partitioning means including an elastic partition membrane composed of rubber-like elastomer material and a pair of displacement-regulating members regulating the displacement amount of the elastic partition membrane from both sides and having respective openings, wherein the openings include a first opening formed on a radially central side and a plurality of second openings formed around the first opening in a distributed manner; the elastic partition membrane is made up of a thick-walled portion situated within the first opening when viewed in an axis center direction and on radially central sides of the displacement-regulating members, a thin-walled portion located radially outwardly of the thick-walled portion and formed thinner than the thick-walled portion thereby being spaced apart from the pair of the displacement-regulating members, a stationary portion located at a peripheral margin of the thin-walled portion and pinched and secured between the pair of the displacement-regulating members radially outwards of the second openings, first ribs situated at one face of the thin-walled portion around the thick-walled portion in a distributed manner and formed integrally with a boundary between the thick-walled portion and the thin-walled portion in a spaced relation to the one of the pair of the displacement-regulating members, and second ribs situated at the other face of the thin-walled portion around the thick-walled portion and formed integrally with a boundary between the thick-walled portion and the thin-walled portion in a spaced relation to the other of the pair of the displacement-regulating members; the first attachment fitting is constituted as coupling means coupled to a vehicle body frame side and the second attachment fitting is constituted as coupling means coupled to a vibration generator side, whereby a part of a vibration transmitting path from the partitioning means to the vehicle body frame is constituted by the vibration-isolating base.

The hydraulic antivibration device as set forth in claim 2 is directed to the hydraulic antivibration device as set forth in claim 1, wherein the first and the second ribs are disposed in a radial fashion relative to the axis center when viewed in the axis center direction of the elastic partition membrane and equidistantly in the circumferential direction.

The hydraulic antivibration device as set forth in claim 3 is directed to the hydraulic antivibration device as set forth in claim 1 or 2, wherein the first and the second ribs are provided, on opposite faces thereof to the pair of the displacement-regulating members, with top portions in a projecting manner, the top portions being set in such a height dimension that they are situated to be spaced apart from the pair of the displacement-regulating members upon assembling of the partitioning means.

The hydraulic antivibration device as set forth in claim 4 is directed to the hydraulic antivibration device as set forth in claim 1 or 2, wherein the first and the second ribs are provided, on their opposite faces to the pair of the displacement-regulating members, with top portions in a projecting manner, the top portions being set in such a height dimension that they are situated to abut on the pair of the displacement-regulating members upon assembling of the partitioning means.

The hydraulic antivibration device as set forth in claim 5 is directed to the hydraulic antivibration device as set forth in any one of claims 1 to 4, wherein at least on the one face of the thin-walled portion, auxiliary ribs are formed in a residual space thereof other than a space where the first ribs or the second ribs are formed, and the auxiliary ribs are constructed so that their rib height is smaller than and their rib width is narrower than the first ribs and the second ribs.

A hydraulic antivibration assembly device as set forth in claim 6 comprises the hydraulic antivibration device as recited in any one of claims 1 to 5 and a vibration generator side bracket coupling the aforesaid hydraulic antivibration device to the vibration generator side, wherein the second attachment fitting includes a small-diameter cylinder portion, a large-diameter cylinder portion having a larger diameter than the small-diameter cylinder portion, and a step portion joining the large-diameter cylinder portion and the small-diameter cylinder portion; the large-diameter cylinder portion is internally press-fitted in an inner periphery of the vibration generator side bracket, and the inner periphery of the vibration generator side bracket is formed with an abutment portion capable of abutting on the step portion of the second attachment fitting internally press-fitted therein and jutting radially inwardly.

The hydraulic antivibration assembly as set forth in claim 7 is directed to the hydraulic antivibration apparatus as recited in claim 6, wherein the second attachment fitting is constructed so that the large-diameter cylinder portion thereof is situated on the first attachment fitting side than the small-diameter attachment fitting, and the large-diameter cylinder portion is internally press-fitted in the inner periphery of the vibration generator side bracket and that in the internal press-fitting state, the step portion of the second attachment fitting is situated on the first attachment fitting side than the abutment portion of the vibration generator side bracket.

Effects of the Invention

According to the hydraulic antivibration device as set forth in claim 1, because the elastic partition membrane is constructed of the thick-walled portion and the thin-walled portion, and the thick-walled portion and the thin-walled portion are respectively formed on a radially center side and radially outwardly, it is possible to make the elastic partition membrane susceptible to reciprocating displacement and to deform it easily, submitting to hydraulic pressure fluctuations between the first and the second liquid chambers. As a result, when a relatively small amplitude vibration is input, the invention effect accrues that a hydraulic pressure difference between the first and the second liquid chambers can be efficiently absorbed and hence a low dynamic spring characteristic can be ensured.

Further because the thick-walled portion of the elastic partition membrane is constructed to be situated within the first opening when viewed in the axis center direction, it is possible to transmit efficiently hydraulic pressure fluctuations between the first and the second liquid chambers through the first opening to the thick-walled portion of the elastic partition membrane. As a consequence, the effect accrues that the submissive deformation of the elastic partition membrane complying with the hydraulic pressure fluctuations can be more efficiently conducted, thereby ensuring more a low dynamic spring characteristic.

On the other hand, when a relatively large amplitude vibration is input, the first ribs or the second ribs abut on the displacement-regulating members to regulate the reciprocating displacement, whereby it is possible to enhance the stiffness of the membrane. As a result, there accrues the effect that it is possible to make the fluid susceptible to fluidizing between both liquid chambers, so that a damping function due to fluidization effect of the fluid is efficiently exhibited and a high damping characteristic can be obtained.

Moreover because the first ribs and the second ribs are formed at the boundary between the thick-walled portion and the thin-walled portion, the effect accrues that by abutment of the first and the second ribs against the displacement-regulating members, it is possible to take advantage of effectively the stiffness of the thick-walled portion thereby to enhance more the stiffness of the elastic partition membrane as a whole, as a result of which it is possible to securely obtain a high damping characteristic as described above.

And besides, even in this situation (where a relatively large displacement is input), because the first ribs and the second ribs are arranged in a distributed manner in the surroundings of the thick-walled portion, it is possible to make the contact area of the elastic partition membrane with the displacement-regulating members small, so that there accrues the effect that it is possible to suppress the generation of strange sounds attributed to collision of the elastic partition membrane with the displacement-regulating members by that decrement.

Furthermore because the first attachment fitting is constructed as body frame side coupling means adapted to be coupled to the vehicle body frame side and the second attachment fitting is constructed as vibration generator side coupling means adapted to be coupled to the vibration generator side, it is possible to constitute a part of a vibration transmitting path from the partitioning means (the elastic partition membrane and the displacement-regulating members) to the vehicle body frame by the vibration-isolating base.

As a consequence, even if the elastic partition membrane impinges on the displacement-regulating members and the displacement-regulating members oscillate, the effect accrues that it is possible to suppress reliably the transmission of the oscillation to the vehicle body frame by reason of the vibration insulating effect of the vibration-isolating base constituting part of the vibration transmitting path and to greatly reduce the generation of strange sounds.

According to the hydraulic antivibration device as set forth in claim 2, because of the disposition that the first and the second ribs are disposed in a radial fashion relative to the axis center as viewed in the axis center direction and equidistantly in the circumferential direction, in addition to the effects achieved by the hydraulic antivibration device as set forth in claim 1, there is achieved the effect that the thick-walled portion can be supported with a uniform force from its surroundings. As a result, it is possible to prevent a force from acting unevenly on the thick-walled portion thereby elevating the durability and exhibiting more effectively the above-mentioned elevation effect of the membrane stiffness.

According to the hydraulic antivibration device as set forth in claim 3, because of the construction that the top portions are formed on respective faces of the first and the second ribs opposite to the displacement-regulating members and set in a height dimension such that the top portions are situated at a spaced relation to the displacement-regulating members, an additional effect to the effects achieved by the hydraulic antivibration device as set forth in claim 1 or 2 is attained in that it is possible to make the elastic partition membrane more susceptible to reciprocating displacement thereby to deform more easily the elastic partition membrane, complying with the hydraulic pressure fluctuations between the first and the second liquid chambers. As a result, when a relatively small amplitude vibration is input, it is possible to efficiently absorb the hydraulic pressure difference between the two liquid chambers to ensure a low dynamic spring characteristic.

Further in the case where for the purpose of obtaining a low dynamic spring characteristic, the height dimension of the top portions is set in such a dimension that they are spaced apart from the displacement-regulating members and yet the first and the second ribs impinge on the displacement-regulating members, the top portions serve as a cushion, so that it is possible to make the first and the second ribs to impinge mildly or moderately on the displacement-regulating members. As a result, there is achieved the effect that it is possible to obtain a low dynamic spring characteristic and to achieve a great reduction of strange sounds.

In accordance with the hydraulic antivibration device as set forth in claim 4, in addition to the effects achieved by the one as set forth in claim 1 or 2, a further effect is achieved in that because the top portions are formed on the faces of the first and the second ribs opposite to the displacement-regulating members and set in a height dimension such that the top portions may abut on the displacement-regulating members, in the case where the first and the second ribs impinge on the displacement-regulating members, attended with inputting of a relatively large amplitude vibration, the top portions resist in such a manner that the first and the second ribs impinge moderately on the displacement-regulating members, and ultimately, the generation of strange sounds can be reliably reduced.

Further because it is only the top portions that abut on the displacement-regulating members, it is possible to suppress to the minimum that the reciprocating displacement of the elastic partition membrane is obstructed, thereby making the elastic partition membrane to sufficiently deform, submitting to hydraulic pressure fluctuations between the first and the second liquid chambers. As a consequence, another effect is achieved in that when a relatively small amplitude vibration is input, it is possible to absorb efficiently a hydraulic pressure difference between the first and the second liquid chambers to obtain securely a low dynamic spring characteristic.

According to the hydraulic antivibration device as set forth in claim 5, additional effect to the effects achieved by the hydraulic antivibration device as recited in any one of claims 1 to 4 is achieved in that because auxiliary ribs are formed at least on the one face of the thin-walled portion and in a residual space thereof other than a space where the first ribs or the second ribs are formed, it is possible to fortify the thin-walled portion, which is inferior in strength among the elastic partition membrane. Therefore it is possible to suppress a failure or the like of the thin-walled portion involved by the displacement upon inputting of vibrations thereby enhancing the durability thereof.

Further because the auxiliary ribs are constructed so that they are lower in rib height and narrower in rib width than the first ribs and the second ribs, there accrues the effect that it is possible to suppress a rise in stiffness of the overall elastic partition membrane and to maintain a low dynamic spring characteristic when a relatively small amplitude vibration is input.

Where the thin-walled portion impinges on the displacement-regulating members, attended with inputting of relatively large amplitude vibrations, the auxiliary ribs serve as a cushion, so that it is possible to collide the thin-walled portion moderately with the displacement-regulating members and consequently, the effect accrues that generation of strange sounds can be more securely reduced.

In accordance with the hydraulic antivibration assembly as set forth in claim 6, in addition to the effects achieved by the hydraulic antivibration device as recited in any one of claims 1 to 5, an effect is attained in that because the second attachment fitting is provided with the step portion and the vibration generator side bracket is provided at its inner periphery with the abutment portion, it is possible to make the step portion to abut on the abutment portion when internally press-fitting the second attachment fitting into the inner periphery of the vibration generator side bracket, thereby performing the positioning of the press-fitting direction. As a further effect, where the loading in the press-fitting direction acts on the second attachment fitting, attended by inputting of a large amplitude vibration, the step portion serves to abut on the abutment portion, whereby it is possible to avoid detachment of the second attachment fitting from the inner periphery of the vibration generator side bracket.

According to the hydraulic antivibration assembly as set forth in claim 7, an additional effect to the effects achieved by the hydraulic antivibration assembly as recited in claim 6 is achieved in that because the second attachment is constructed so that the large-diameter cylinder portion may be situated on the first attachment fitting side more than the small-diameter attachment cylinder portion and concurrently so that when the large-diameter cylinder portion is internally press-fitted in the inner periphery of the vibration generator side bracket, the step portion of the second attachment fitting may be situated on the first attachment fitting side more than the abutment portion of the vibration generator side bracket, it is possible to preclude more securely the second attachment fitting from coming off from the inner periphery of the vibration generator side bracket.

Specifically stated, according to the foregoing construction, where the vibration generator side bracket, after the vibration generator is supported and fixed, is displaced in the carrying weight direction (namely, where the second attachment fitting is displaced toward the first attachment fitting), elastic recovery force of the compression deformed vibration-isolating base works as a force obstructing the movement of the second attachment fitting, so that the second attachment fitting is liable to be detached from the inner periphery of the vibration generator side bracket. However, according to the hydraulic antivibration assembly as recited in claim 7, the step portion of the second attachment fitting abuts on the abutment portion of the vibration generator side bracket, whereby the aforementioned detachment can be avoided.

Incidentally in the case where the vibration generator side bracket is displaced in the opposite direction to the carrying load (namely, where the second attachment fitting is displaced in the direction receding from the first attachment fitting), the elastic recovery force of the compression-deformed vibration-isolating base works as a force assisting the movement of the second attachment fitting, so that the second attachment fitting is difficult to come off from the inner periphery of the vibration generator side bracket, which fact dispenses with any preventive expedient of the aforesaid detachment.

Figure 1A:
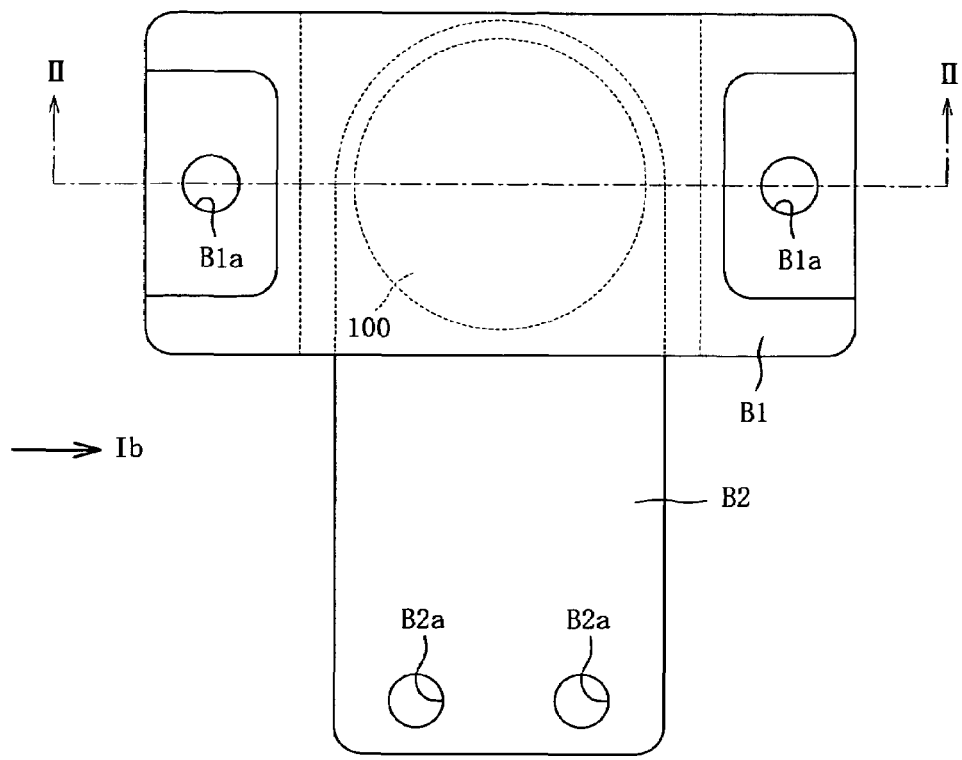
FIG. 1 is a diagrammatic view showing an operating state of a hydraulic antivibration device in one embodiment of this invention, wherein (a) is a top plan view and (b) is a side elevation when viewed in the arrow direction Ib in FIG. 1(a).

DESCRIPTION OF REFERENCE CHARACTERS 100 hydraulic antivibration device (part of a hydraulic antivibration assembly)
1 first attachment fitting
2 second attachment fitting
2a large-diameter cylinder portion
2b small-diameter cylinder portion
3 vibration-isolating base
5 diaphragm
6 liquid-filled chamber
6A first liquid chamber
6B second liquid chamber
20 orifice
7 partitioning means
8 orifice member (part of the partitioning means)
84 plate member (part of a displacement-regulating member)
84a first opening
84b second opening
9 plate member (part of a displacement-regulating member, part of the partitioning means)
94a first opening
94b second opening
10, 210 elastic partition membrane (part of the partitioning means)
11, 211 thick-walled portion
12, 212 thin-walled portion
13 stationary portion
14, 214 first rib
14a, 214a top portion
15, 215 second rib
15a, 215a top portion
216 auxiliary rib
EG engine (vibration generator)
BF vehicle body frame
B2, B12 engine side bracket (vibration generator side bracket, part of the hydraulic antivibration assembly)
B12b abutment portion

BEST MODE FOR CARRYING OUT THE INVENTION

Preferred embodiments of this invention will be hereinafter described with reference to the accompanying drawings. FIG. 1 is a diagrammatic view showing the state of use of the hydraulic antivibration device 100 in one embodiment of this invention, wherein (a) is a top plan view and (b) is a side elevation when viewed from the arrow direction Ib in FIG. 1(a).

The hydraulic antivibration device 100 is a vibration-proof device for supporting and fixing the automotive engine EG so as not to transmit vibrations of the engine EG to the vehicle body frame BF. As shown in FIG. 1, it is coupled to the body frame BF through the body frame side bracket B1 and to the engine EG through the engine side bracket B2.

The body frame side bracket B1 is fastened and secured to the body frame BF with a bolt (not shown) inserted through an attachment hole B1a whereas the engine side bracket B2 is fastened and secured to an engine side member EG1 through a bolt (not shown) inserted through an attachment hole B2a. As a consequence, a carrying weight directed in the downward direction in FIG. 1(b) acts on the hydraulic antivibration device 100 supporting and fixing the engine EG.

Figure 2:
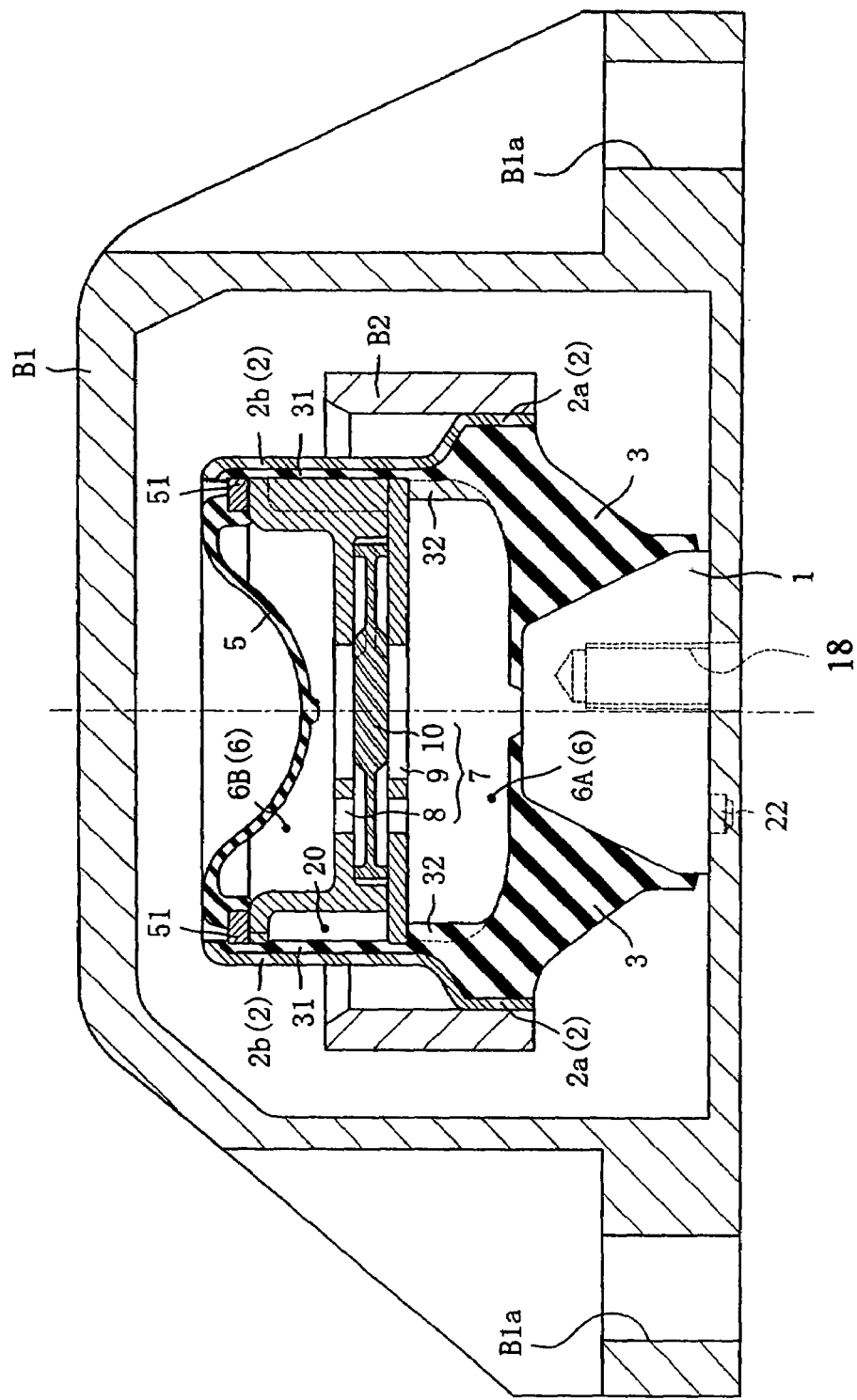
FIG. 2 is a sectional view of the hydraulic antivibration device taken along II-II line in FIG. 1(a).

FIG. 2 is a sectional view of the hydraulic antivibration device 100 taken along II-II line in FIG. 1(a). In FIG. 2, the first attachment fitting 1 is indicated, but omitted when viewed in cross-section.

Figure 1B:
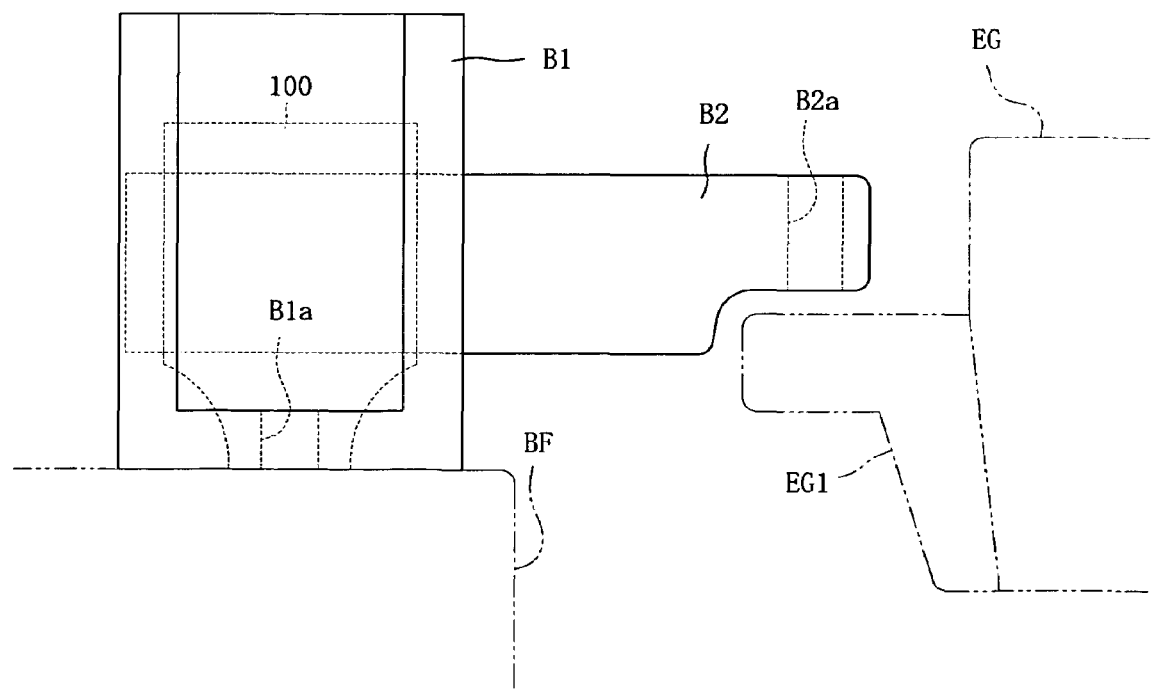

The hydraulic antivibration device 100 is, as shown in FIG. 2, mainly provided with the first attachment fitting 1 to be attached to the body frame BF side (cf. FIG. 1(b)) through the intermediary of the body frame side bracket B1, the cylindrical second attachment fitting 2 to be attached to the engine EG side (cf. FIG. 1(b)) through the engine side bracket B2, and the vibration-isolating base 3 interconnecting these and composed of a rubber-like elastomer As illustrated in FIG. 2, the first attachment fitting 1 is fabricated from aluminum alloy in the shape of a generally frustum of cone in cross-section that is symmetric about an axis center and upwardly tapers off, and provided, at its lower end face, with a female screw portion 11 for fastening to the body frame BF so as to be recessed upwardly. At the lateral side of the female screw portion 11, a positioning pin 22 for fitting in a recessed portion of the body frame side bracket B1 is provided so as to project.

The second attachment fitting 2 is, as illustrated in FIG. 2, configured in a cylindrical form which is open at its upper and lower ends (the upper and lower sides in FIG. 2) from an iron and steel material. The second attachment fitting 2 is constructed to have a step, below which (the lower side in FIG. 2) the large-diameter cylinder portion 2a is formed and above which (the upper side in FIG. 2) the small-diameter cylinder portion 2b is formed. As shown in FIG. 2, the second attachment fitting 2 is, at its large-diameter cylinder portion 2a, internally press-fitted in the inner periphery of the engine side bracket B2.

The vibration-isolating base 3 is, as depicted in FIG. 2, configured from a rubber-like elastomer in a generally truncated conical shape in cross-section that is symmetric about the axis center and downwardly tapers off, and vulcanization bonded between an upper end face and the lateral face of the first attachment fitting 1 and the inner periphery of the second attachment fitting 2 on its lower end side (mainly the large-diameter cylinder portion 2a).

Thus according to the hydraulic antivibration device 100 in this embodiment, because the first attachment fitting 1 is constructed as a body frame side coupling means to be coupled to the body frame BF side while the second attachment fitting 2 is constructed as a vibration generators side coupling means to be coupled to the engine EG (vibration generator) side, part of the vibration transmitting path from the partitioning means 7, which will be later described, to the body frame BF is constituted by the vibration-isolating base 3.

As a result of that, as described later, even if in the partitioning means 7, the elastic partition membrane 10 impinges on the plate members 84, 94 and the plate members 84, 94 in turn oscillate, the transmission of the oscillation is securely suppressed by reason of the vibration insulating effect of the vibration-isolating base 3 constituting a part of the vibration transmitting path, whereby the generation of strange sounds can be greatly reduced.

At the upper end (the upper side in FIG. 2) of the vibration-isolating base 3, as shown in FIG. 2, a rubber membrane 31 covering the inner peripheral face of the second attachment fitting 2 (mainly the small-diameter cylinder portion 2b) is linked thereto. This rubber membrane 31 is fayed with an orifice-forming wall 81 (cf. FIG. 3) of the orifice member 8, the outer periphery of the plate member 9, and an attachment fitting 51 of the diaphragm 5, which will be later described.

The diaphragm 5 is configured in the form of a rubber membrane having a partial sphere, as illustrated in FIG. 2, from a rubber-like elastomer and attached to the upper end (the upper side in FIG. 2) of the second attachment fitting 2 (the small-diameter cylinder portion 2b). As a result, between the downside of the diaphragm 5 and the upside of the vibration-isolating base 3 there is formed the liquid-filled chamber 6.

In the liquid-filled chamber 6, a non-freezing liquid such as ethylene glycol (not shown) is sealed. The liquid-filled chamber 6 is partitioned by the partitioning means 7 (the orifice member 8, the plate member 9, and the elastic partition membrane 10), which is later described, into two chambers of the first liquid chamber 6A on the vibration-isolating base 3 side (the lower side in FIG. 2) and the second liquid chamber 6B on the diaphragm 5 side (the upper side in FIG. 2).

The diaphragm 5 is vulcanization bonded to the attachment fitting 51 in the form of a donut shape when viewed from the top plane, and attached through the attachment fitting 51 to the upper end (the upper side in FIG. 2) of the second attachment fitting 2, as shown in FIG. 2.

As mentioned above, the partitioning means 7 comparts the liquid-filled chamber 6 into the first liquid chamber 6A and the second liquid chamber 6B, and is made up of the orifice member 8 configured in a generally columnar shape from a metal material, the plate member 9 configured in a generally disc shape from a metal material, and the elastic partition membrane 10 configured in a generally disc shape from a metal material.

At the outer periphery of the orifice member 8, an orifice 20 is formed between the orifice member and the inner periphery (the rubber membrane 31) of the second attachment fitting 2. The orifice 20 is an orifice passage through which to put the first liquid chamber 6A and the second liquid chamber 6B into communication with each other.

The orifice 20 is put into communication through a cutout 83 (cf. FIG. 3) formed in the orifice-forming wall 81 of the orifice member 8 with the second liquid chamber 6B and through a cutout 93 (cf. FIG. 4) formed in the outer periphery of the plate member 9 with the second liquid chamber 6B.

Here, the assembling of the hydraulic antivibration device 100 is conducted by first fitting the partitioning means 7 and the diaphragm 5 in this order from the opening at the upper end of the second attachment fitting 2 (the upper side in FIG. 2) and subsequently subjecting the entirety of the small-diameter cylinder portion 2b of the second attachment fitting 2 to necking working (drawing working) in the radial direction (the lateral direction in FIG. 2).

As a result of this process, the partitioning means 7 (the plate member 9) is, as shown in FIG. 2, pinched and secured between a partitioning means-receiving portion 32 provided at the vibration-isolating base 3 and the diaphragm 5 in the axis center direction (the vertical direction in FIG. 2) of the hydraulic antivibration device 100. The partitioning means-receiving portion 32 is formed as a step portion in a plurality of places (or in the whole circumference) at the upside of the vibration-isolating base 3 and serves to bear the lower end face (the lower side in FIG. 2) of the partitioning means 7 (the plate member 9) by the step portion.

In this assembled state, the partitioning means-receiving portion 32 is deformed under compression, and the elastic recovery force of it acts on the lower end face of the partitioning means 7 as a holding power of the partitioning means 7. Thereby even in the case where a large amplitude or high frequency vibration is input, it is possible to pinch and secure the partitioning means 7 strongly and stably, thereby precluding any influence on dynamic characteristics attributed to the positional deviation of the respective members 8, 9, 10 and resonance.

Now referring to FIGS. 3 to 7, respective members 8, 9, 10 constituting the partitioning means 7 will be described in turn. In the description of the respective members 8, 9, 10, FIG. 7, which is a top plan view and a cross-sectional view of the partitioning means 7, is referred to appropriately.

Figure 3A:
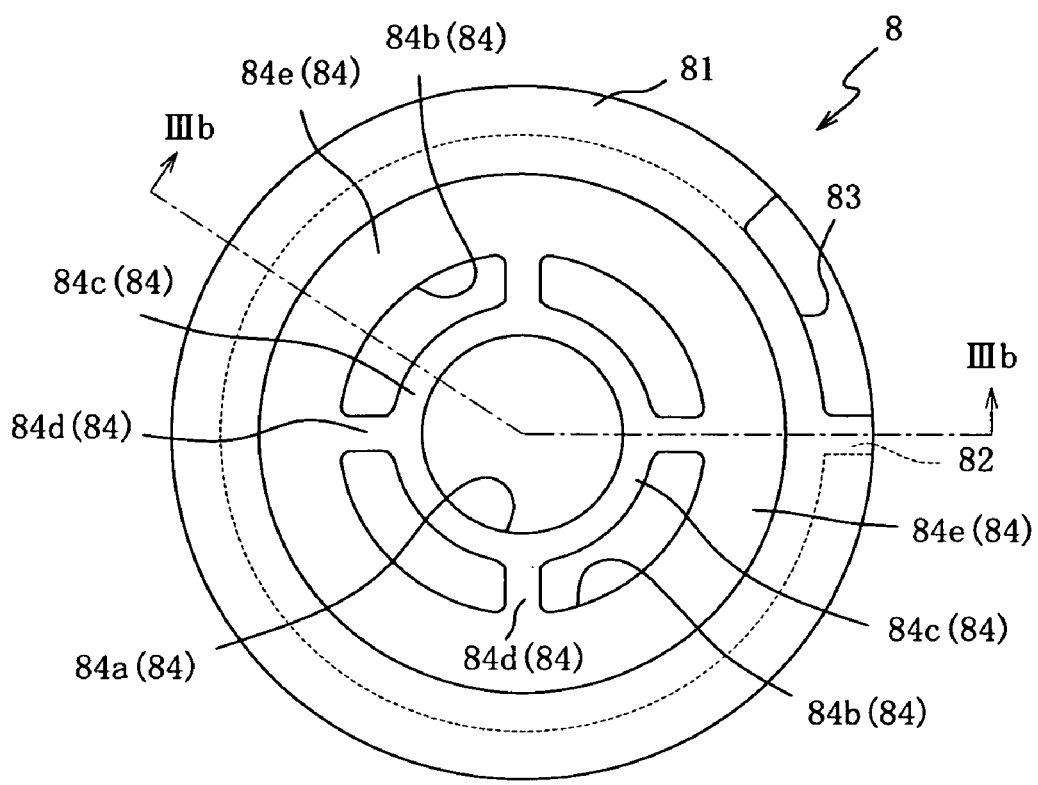
FIG. 3(a) is a top plan view of an orifice member and (b) is a cross-sectional view of the orifice member taken along IIIb-IIIb in FIG. 3(a).
Figure 3B:
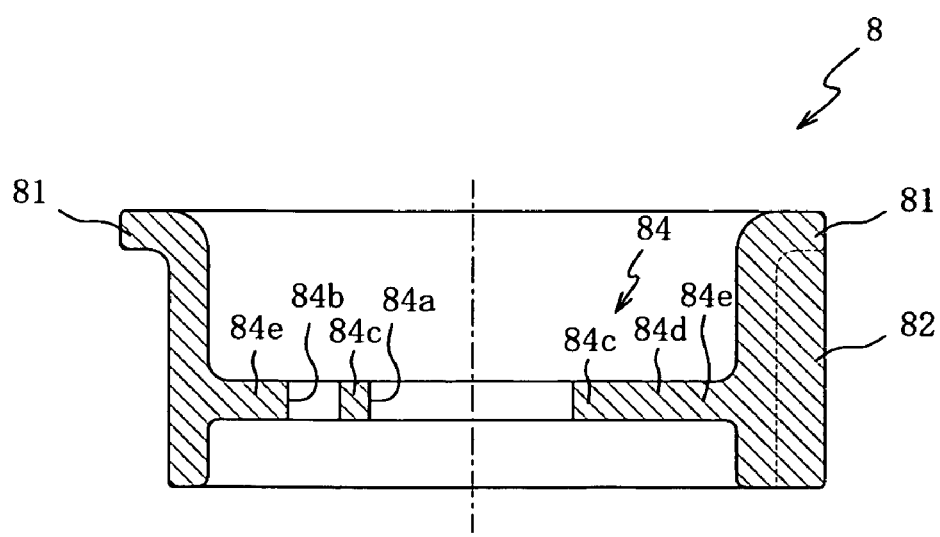

Firstly, the orifice member 8 constituting the partitioning means 7 will be described with reference to FIG. 3. FIG. 3($a$) is a top plan view of the orifice member 8 and FIG. 3($b$) is a sectional view of the orifice member 8 taken along IIIb-IIIb line in FIG. 3($a$).

The orifice member 8 is fashioned in a generally cylindrical shape having an axis center and a hollow at its inner periphery, as illustrated in FIG. 3, from a metal material such as aluminum. At the axially upper end (the upper side in FIG. 3($b$)) of the orifice member 8, the orifice-forming wall 81 in a roughly flange form is provided over a full circumference thereof in a projecting manner.

At the outer periphery of the orifice member 8, there is provided a longitudinal wall 82 dividing the orifice 20 (cf. FIG. 2) in the circumferential direction in a projecting manner. Further the orifice-forming wall 81 is formed at its outer peripheral margin with the cutout 83, as shown in FIG. 3($a$), assuming a roughly U-shape as viewed from the top plane. As stated above, the orifice 20 communicates through the cutout 83 with the second liquid chamber 6B (cf. FIG. 2).

At the inner periphery of the orifice member 8, there is formed integrally the plate member 84 having a constant thickness as shown in FIG. 3, which is in turn pierced with a plurality of (five in this embodiment) openings (the first and the second openings 84$a$, 84$b$) in a distributed manner and formed with displacement-regulating portions 84$c$ to 84$e$ alongside of peripheral margins of the first and the second openings 84$a$, 84$b$.

The first opening 84$a$ is, as shown in FIG. 3, pierced in a circular form in a radially center of the plate member 84, and the second openings 84$b$ are pierced around the first opening 84$a$ in plural number (four in this embodiment) and disposed in a distributed manner. The respective second openings 84$b$ assume such a shape that a circumferentially extending annular hole is divided in a radial fashion, and are disposed in a point symmetry about the axis center of the first opening 84$a$.

As shown in FIG. 3($a$), the displacement-regulating portions 84$c$ and 84$e$ are formed in an annular shape concentric with the first opening 84$a$ whereas the displacement-regulating portion 84$d$ is formed in a radial and rectilinear fashion relative to the axis center of the first opening 84$a$. The width dimensions of the displacement-regulating portion 84$c$ and the displacement-regulating portion 84$d$ are nearly of the same width and made narrower than the opening width (lateral width in FIG. 3($b$)) of the second openings 84$b$. As a result, the contact area of the orifice member with the elastic partition membrane 10 is made smaller and the hydraulic pressure fluctuations from the second liquid chamber 6B can be efficiently transmitted to the elastic partition membrane 10 (cf. FIG. 2).

Figure 4A:
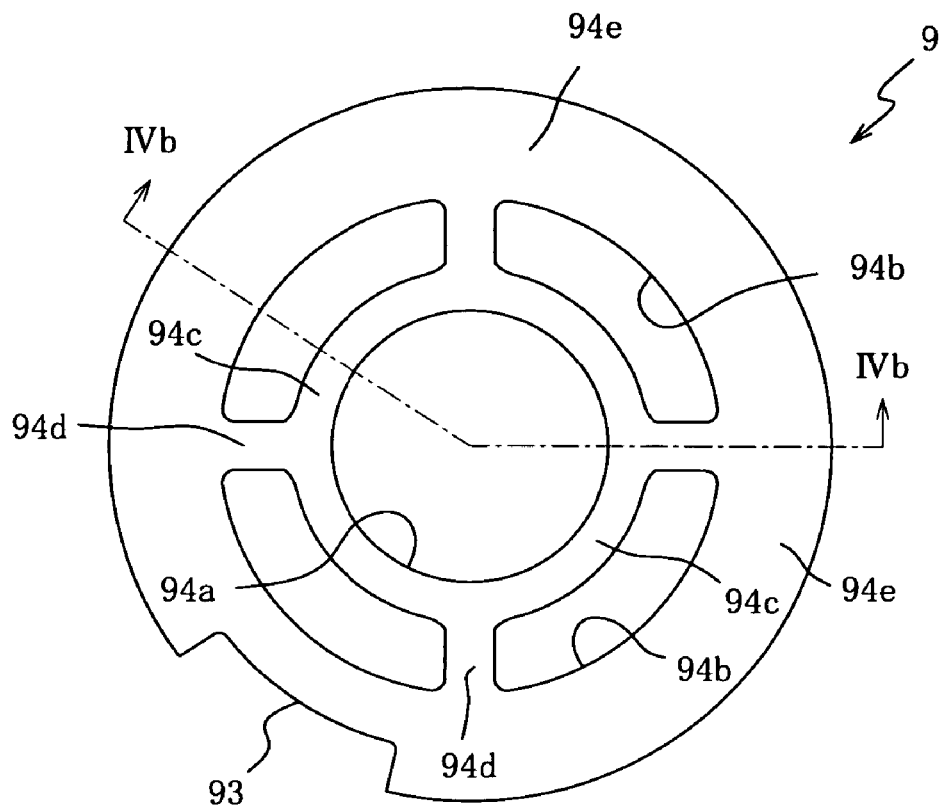
FIG. 4(a) is a top plan view of a plate member and (b) is a sectional view of the plate member taken along IVb-IVb line in FIG. 4(a).
Figure 4B:
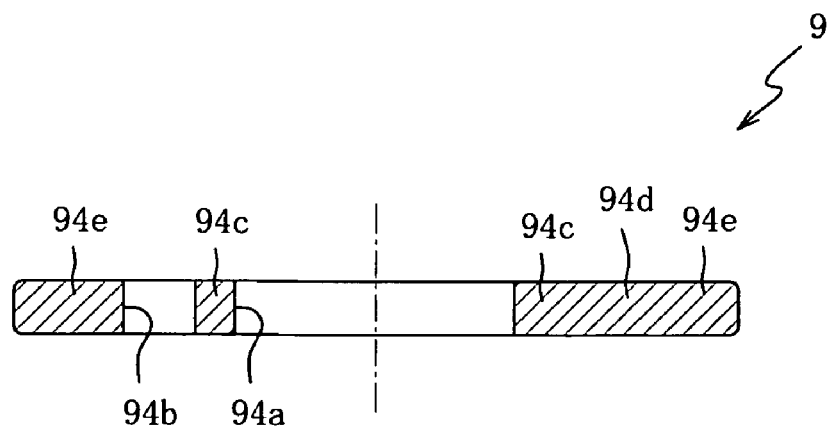

Secondly, the plate member 9 constituting the partitioning means 7 will be described referring to FIG. 4. FIG. 4($a$) is a top plan view of the plate member 9 and FIG. 4($b$) is a sectional view of the plate member taken along IVb-IVb line in FIG. 4($a$).

As shown in FIG. 4, the plate member 9 is fashioned in a generally circular shape having an axis center and a constant thickness from a metal material such as aluminum alloy and defined at its outer peripheral margin with the cutout 93 assuming a roughly U-shape as viewed from the top plane. As mentioned above, the orifice 20 communicates through the cutout 93 with the first liquid chamber 6A (cf. FIG. 2).

The plate member 9 is, similarly to the plate member 84 of the orifice member 8, pierced with a plurality of (five in this embodiment) openings (the first and the second openings 94$a$, 94$b$), and the displacement-regulating portions 94$c$ to 94$e$ are formed alongside of the peripheral margins of the first and the second openings 94$a$, 94$b$.

The first and second openings 94$a$, 94$b$ and the displacement-regulating portions 94$c$ to 94$e$ are constructed in the same pattern (position, size, shape, etc.) as in the first and second openings 84$a$, 84$b$ and the displacement-regulating portions 84$c$ to 84$e$ formed at the orifice member 8, and the description of them is omitted, accordingly.

Figure 5A:
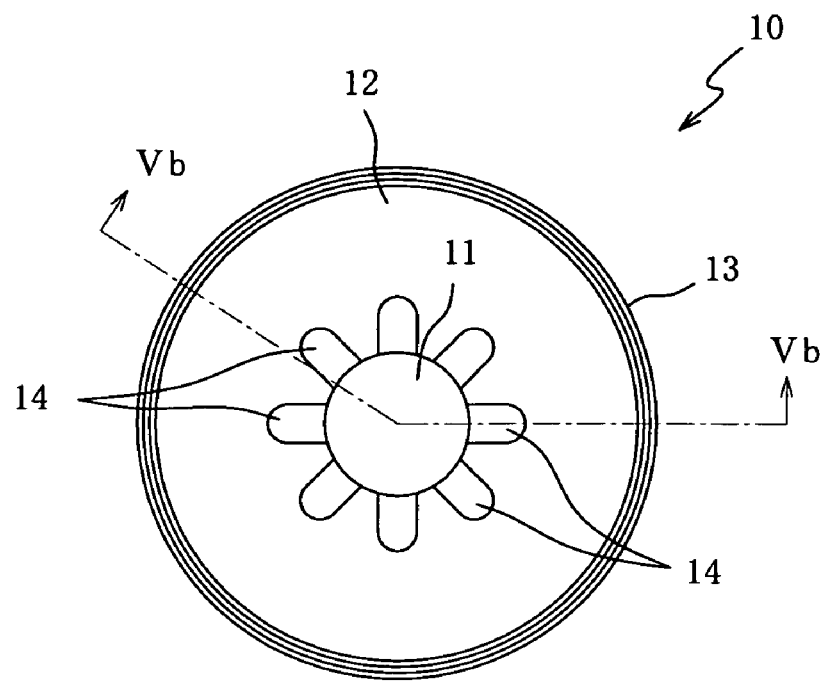
FIG. 5(a) is a top plan view of an elastic partition membrane and (b) is a sectional view of the elastic partition membrane taken along Vb-Vb line in FIG. 5(a).
Figure 5B:
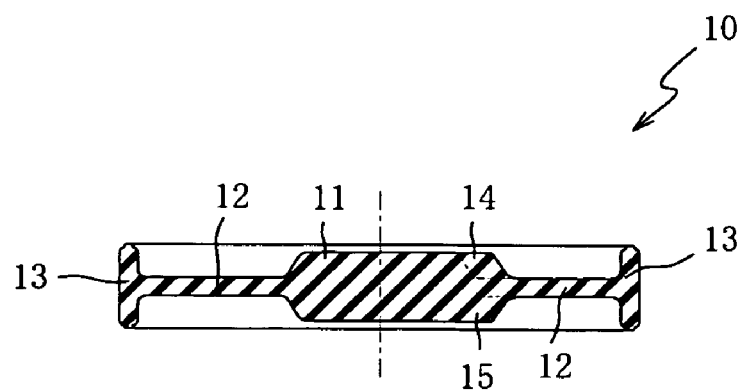
Figure 6:
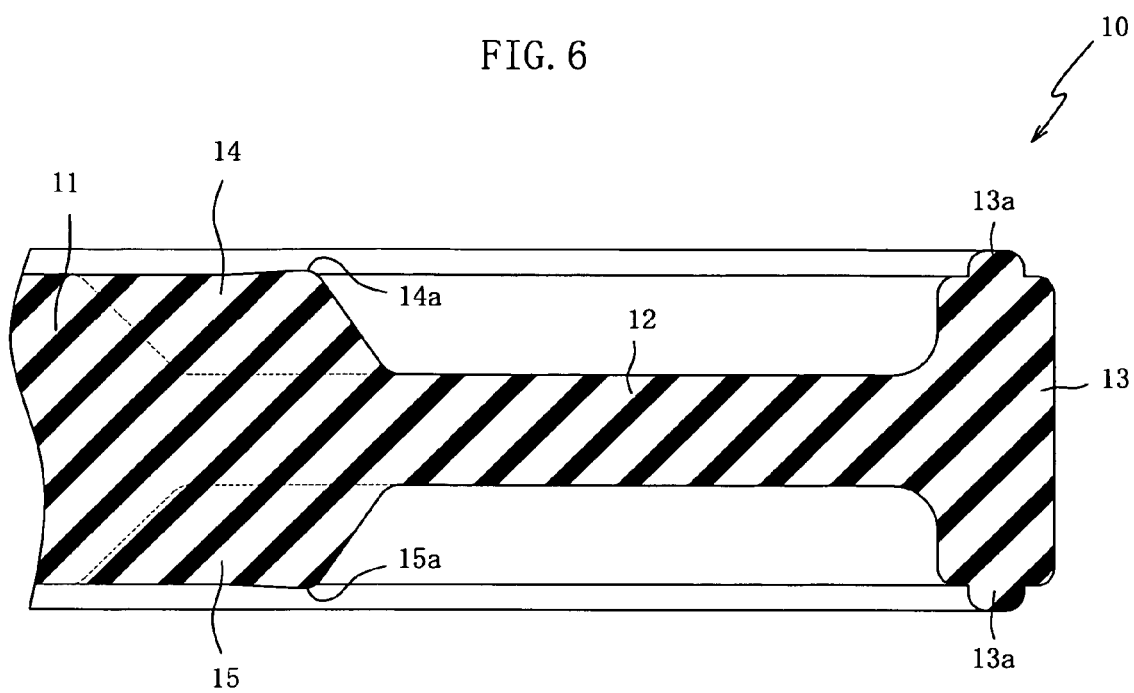
FIG. 6 is a partially enlarged sectional view of the elastic partition membrane.

Then the elastic partition membrane 10 constituting the partitioning means 7 will be described with reference to FIGS. 5 and 6. FIG. 5($a$) is a top plan view of the elastic partition membrane 10, while FIG. 5($b$) is a sectional view of the elastic partition membrane 10 taken along Vb-Vb line in FIG. 5($a$). FIG. 6 is a partially enlarged sectional view of the elastic partition membrane 10.

The elastic partition membrane 10 is accommodated between opposing faces of the plate members 84, 94 (cf. FIG. 7) and has a function of mollifying the hydraulic pressure difference between the first and second liquid chambers 6A, 6B. The elastic partition membrane 10 is configured in a generally disc shape from a rubber-like elastomer and, as shown in FIG. 5, mainly made up of the thick-walled portion 11, the thin-walled portion 12, the stationary portion 13 and the first and the second ribs 14, 15.

The thick-walled portion 11 is situated in a radially nearly center of the elastic partition membrane 10 and configured in a generally circular shape when viewed from the top plane, as shown in FIG. 5. The diameter dimension of the thick-walled portion 11 is set so that the thick-walled portion may be situated within the aforesaid first openings 84$a$, 94$a$ (cf. FIGS. 3 and 4) when viewed in the axis center direction in the assembled state of the partitioning means 7 (stated another way, they are not doubled when viewed in the axis center direction) (cf. FIG. 7).

The thin-walled portion 12 is, as shown in FIGS. 5 and 6, located radially outwards of the thick-walled portion 11, and formed to be thinner (for example, ¼ to ½ the thickness of the thick-walled portion 11) than the thick-walled portion 11. The thin-walled portion 12 is linked to a middle area in the thickness direction of the thick-walled portion 11, and located in a spaced relation to the plate members 84, 94 (cf. FIG. 7).

Figure 7A:
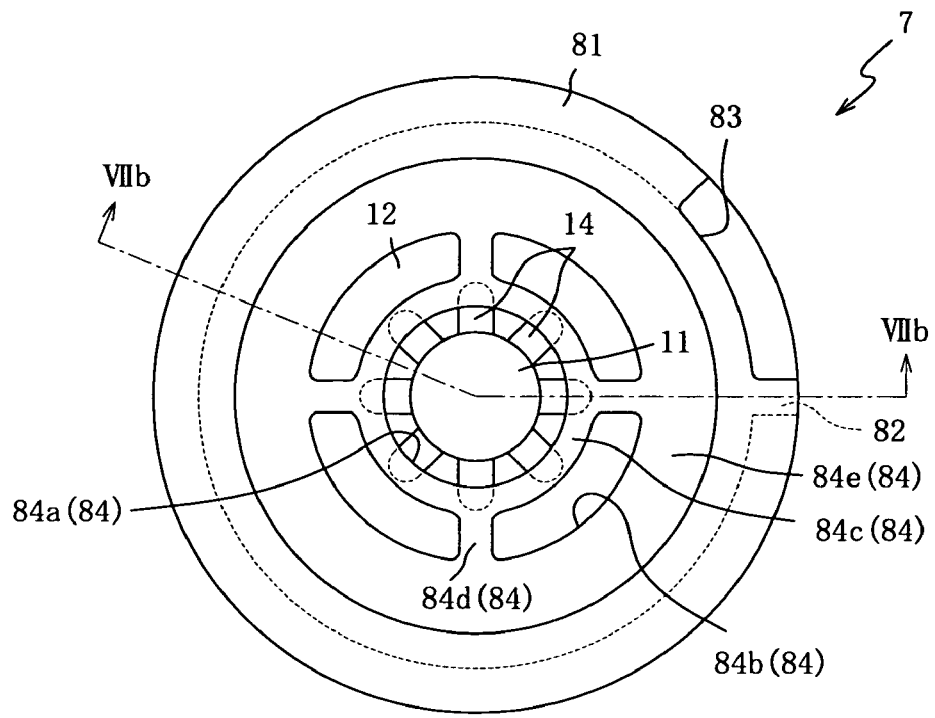
FIG. 7(a) is a top plan view of a partitioning means and (b) is a sectional view of the partitioning means taken along VIIb-VIIb line in FIG. 7(a).
Figure 7B:
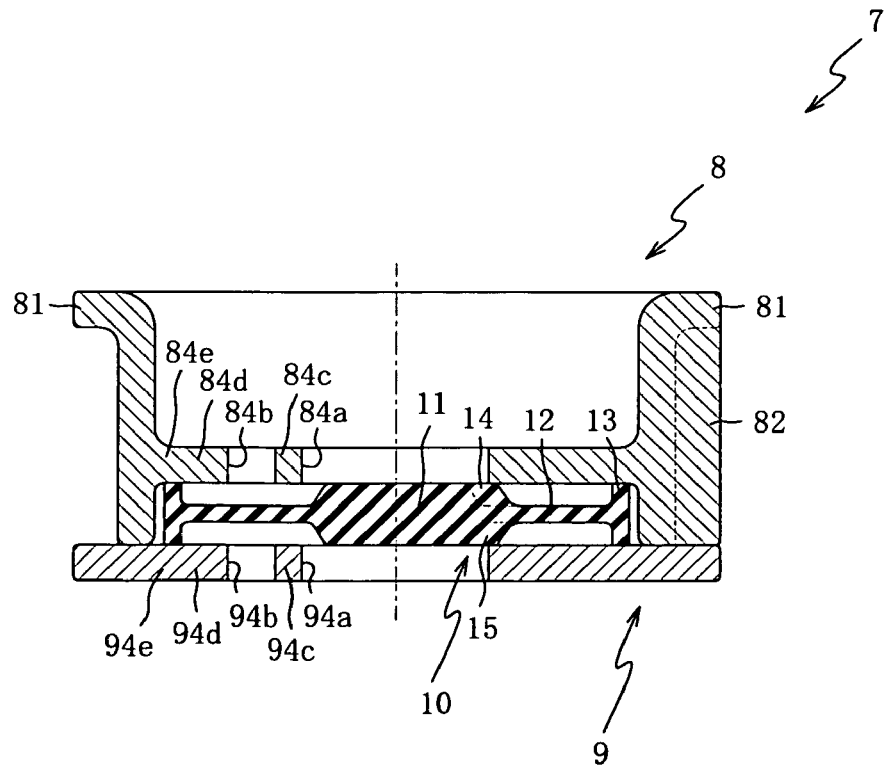

The stationary portion 13 is, as shown in FIGS. 5 and 6, vertically provided on the one face side and the other face side of the thin-walled portion 12 at its peripheral margin, and pinched and secured radially outwards of the second openings 84*b*, 94*b* (cf. FIGS. 3 and 4) between the plate members 84, 94 (the displacement-regulating portions 84*e*, 94*e*)(cf. FIG. 7).

At each of the top portions of the stationary portion 13, a raised portion 13*a* assuming a roughly arc shape in cross-section is provided as shown in FIG. 6 and serves as a sealing part in the assembled state of the partitioning means 7, whereby leakage of fluid between the first and the second liquid chambers 6A, 6B is prevented.

As shown in FIG. 6, the thickness dimension of the elastic partition membrane 10 between both raised portions 13*a* (the vertical dimension in FIG. 6) is made to be thicker than the thickness dimension at the thick-walled portion 11 and the thickness dimension between the top portions 14*a*, 15*a*, which is later described.

As shown in FIGS. 5 and 6, the first and the second ribs 14, 15 in plural number (eight per one face in this embodiment) are located around the thick-walled portion 11 respectively at the one face side and the other face side of the thin-walled portion 12 in a distributed state, and formed integrally with a boundary between the thick-walled portion 11 and the thin-walled portion 12.

As described above, the elastic partition membrane 10 is composed of the thick-walled portion 11 and the thin-walled portion 12, which are located respectively in the radially center and radially outside thereof, and consequently, it is possible to make the elastic partition membrane 10 susceptible to reciprocating displacement thereby deforming it by readily following the hydraulic pressure fluctuatons between the first and the second liquid chambers 6A, 6B.

Further because the thick-walled portion 11 of the elastic partition membrane 10 is constructed so as to be situated within the first openings 84*a*, 94*a* when viewed in the axis center direction (cf. FIG. 7), it is possible to transmit efficiently the hydraulic pressure fluctuations between the first and the second liquid chambers 6A, 6B through the first openings 84*a*, 94*a* to the thick-walled portion 11 of the elastic partition membrane 10.

As a result, since it is possible to perform more efficiently such submissive deformation of the elastic partition membrane 10 to the aforesaid hydraulic pressure fluctuations, when a relatively small amplitude vibration is input, the hydraulic pressure difference between the first and second liquid chambers 6A, 6B can be efficiently absorbed, thereby obtaining securely a low dynamic spring characteristic.

On the other hand, when a relatively large amplitude vibration is input, the first or the second ribs 14, 15 abut on the plate members 84, 94 (displacement-regulating portions 84*c*, 94*c*) thereby regulating the reciprocating displacement of the elastic partition membrane 10 to enhance the stiffness of the membrane. As a result, it is possible to make the fluid susceptible to fluidizing between the both liquid chambers 6A, 6B, so that a damping function due to fluidization effect of the fluid can be efficiently exhibited and a high damping characteristic can be obtained.

Moreover because the first and the second ribs 14, 15 are formed at the boundary of the thick-walled portion 11 and the thin-walled portion 12, it is possible to take advantage of efficiently the stiffness of the thick-walled portion 11 by the abutment of the first and second ribs 14, 15 against the plate members 84, 94 (the displacement-regulating portions 84*c*, 94*c*), thus more enhancing the stiffness of the elastic partition membrane 10 as a whole. As a result, a high damping characteristic can be ensured as described above.

Here (upon inputting of a relatively large displacement), since the first and the second ribs 14, 15 are arranged in the surroundings of the thick-walled portion 11 in a distributed state, it is possible to render the contact area of the elastic partition membrane 10 with the plate members 84, 94 (the displacement-regulating portions 84*c*, 94*c*) small and accordingly, to suppress effectively the generation of strange sounds ascribed to impingement of the elastic partition membrane 10 on the plate members 14, 15 by that amount.

The respective ribs 14, 15 are arranged in a radial fashion relative to the axis center of the thick-walled portion 11 and at equal intervals of about 45 degrees in the circumferential direction. Further the respective ribs 14, 15 are disposed in a mutually superposed position when viewed in the axial center direction. Therefore when a relatively large amplitude vibration is input and the first and the second ribs 14, 15 abut (impinge) on the plate members 84, 94 (the displacement-regulating portions 84*c*, 94*c*), it is possible to support the thick-walled portion 11 from its surroundings with a uniform force, so that it is possible to prevent the force from acting unevenly on the thick-walled portion 11, thereby elevating the durability and concurrently enhancing more efficiently the membrane stiffness.

As shown in FIG. 6, the first and the second ribs 14, 15 are set to be approximately the same in height dimension from the thin-walled portion 12 as that of the thick-walled portion 11, and formed respectively with the top portion 14*a* and the top portion 15*a* at the upper end face and the lower end face (the upside face and the downside face in FIG. 6) in a projecting manner. In the assembling state of the partitioning means 7, only the top portions 14*a*, 15*a* abut on the plate members 84, 94 (the displacement-regulating portions 84*c*, 94*c*).

Therefore where the first and the second ribs 14, 15 impinge on the plate members 84, 94 (the displacement-regulating portions 84*c*, 94*c*) attended with inputting of a relatively large amplitude vibration, the top portions 14*a*, 15*a* resist such that it is possible to make the first and the second ribs 14, 15 to impinge mildly on the plate members 84, 94, so that it is possible to securely reduce the generation of strange sounds.

Further because it is only the top portions 14*a*, 15*a* low in stiffness that abut on the plate members 84, 94 in the steady state, it is possible to suppress the obstruction of reciprocating displacement of the elastic partition membrane 10 to the minimum, thus deforming the elastic partition membrane 10 sufficiently, complying with the hydraulic pressure fluctuations between the first and the second liquid chambers 6A, 6B by. As a result, where a relatively small amplitude vibration is input, the hydraulic pressure difference between the first and the second liquid chambers 6A, 6B can be efficiently absorbed, thereby obtaining reliably a low dynamic spring characteristic.

The top portions 14*a*, 15*a* may be configured in the form of a circumferentially contiguous raised body or a conical protruding body at the upper end face and the lower end face of the first and the second ribs 14, 15.

The elastic partition membrane 10 is constructed, on the one face side and the other face side, in the same pattern (position, size, shape, etc.) and in a symmetry relative to a plane passing through the midway in the thickness direction and a rotation symmetry relative to the axis center. That is, the elastic partition membrane has not the directionality of its upside and downside and the directionality of its rotational direction, and consequently, in the assembling process of the partitioning means 7 it is unnecessary to take account of the assembling direction of the elastic partition membrane 10, so that the assembling work can be simplified to curtail the working cost.

The invention has been described so far on the basis of the working embodiment, but it will be appreciated that this invention is not limited to the embodiment described above, but various variations or modifications can be made within the scope of this invention without departing from the purport of the invention.

For instance, although no particular mention has been made in the above embodiment, it is alternatively possible to provide auxiliary ribs at least on one face side of the thin-walled portion 12. The height dimension of the top portions 14*a*, 15*a* of the first and the second ribs 14, 15 may be set so that they may be spaced apart from the plate members 84, 94 (the displacement-regulating portions 84*c*, 94*c*).

Figure 8A:
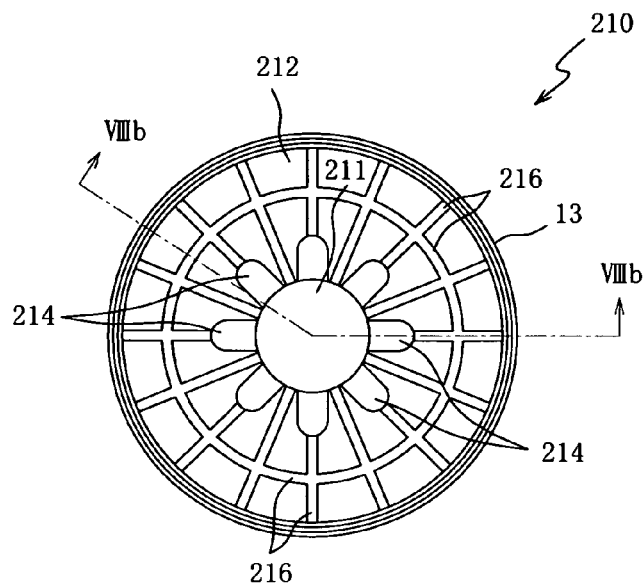
FIG. 8 is a representation showing a variation example of the elastic partition membrane, wherein (a) is a top plan view and (b) is a partially enlarged sectional view of the elastic partition membrane.
Figure 8B:
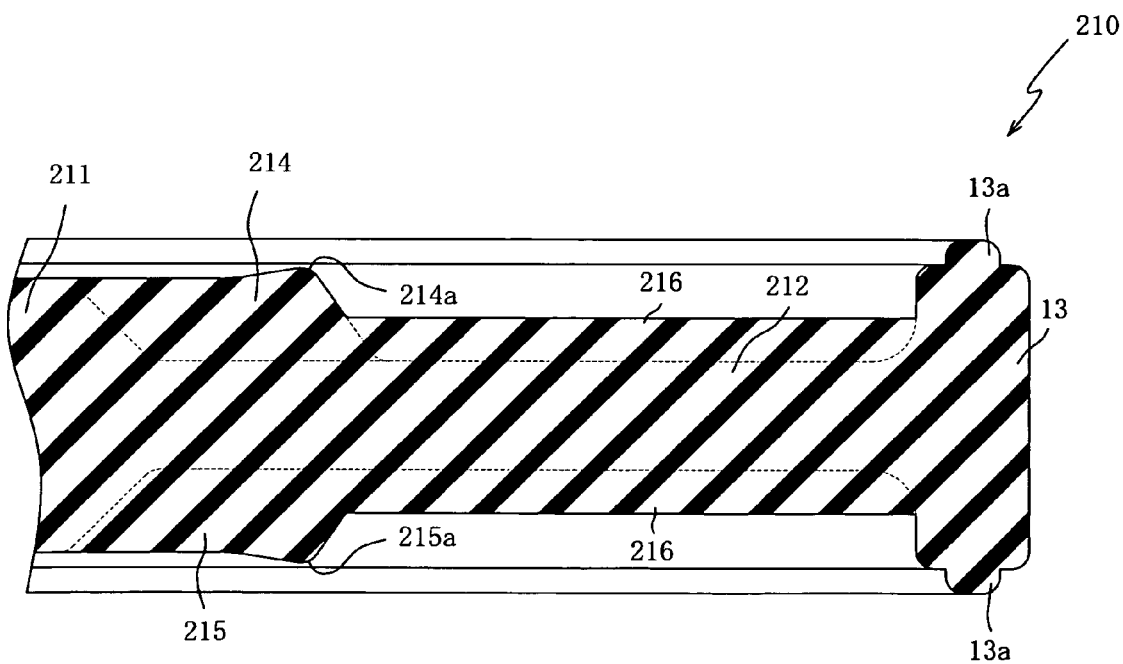

As a variation example, this particular constitution will be now described with reference to FIG. 8. FIG. 8(*a*) is a top plan view of another elastic partition membrane 210 in a variation example, and FIG. 8(*b*) is a partially enlarged sectional view of the elastic partition membrane 210 taken along VIIIb-VIIIb line in FIG. 8(*a*). The parts similar to those in the aforesaid embodiment are designated by like reference numerals, and detailed explanation of them is omitted.

At the thin-walled portion 212 of the elastic partition membrane 210, as shown in FIG. 8, a plurality of the auxiliary ribs 216 are formed in a radial and rectilinear fashion and in an annular fashion centering on the axis center. The auxiliary ribs 216 are formed, on the one face side and the other face side of the thin-walled portion 212, in the same pattern (position, size, shape).

As a consequence, it is possible to fortify the thin-walled portion 212, which is inferior in strength among the elastic partition membrane 210, so that it is possible to suppress a possible failure of the thin-walled portion 212 attended with the reciprocating displacement upon inputting of vibration, thereby enhancing the durability.

As shown in FIG. 8, the auxiliary ribs 216 are constructed to be lower in rib height and narrower in rib width than the first and the second ribs 214, 215, so that it is possible to restrain a rise in stiffness of the elastic partition membrane 210 as a whole thereby maintaining a low dynamic spring characteristic when a relatively small amplitude vibration is input.

On the other hand, where the thin-walled portion 212 impinges on the plate members 84, 94 (the displacement-regulating portions 84*d*, 84*e*, 94*d*, 94*e*), accompanied by inputting of a relatively large amplitude vibration, the auxiliary ribs 216 serve as a cushion, allowing the thin-walled portion 212 to impinge mildly on the plate members 84, 94, and consequently, it is possible to reduce more securely the generation of strange sounds.

Further the thick-walled portion 211 and the first and the second ribs 214, 215 are, as shown in FIG. 8(*b*), set to be lower in height dimension than those in the aforesaid embodiment. In the assembled state of the partitioning means 7, the top portions 214*a*, 215*a* of the first and the second ribs 214, 215 are set in such a height dimension that they are situated to be spaced apart from the plate members 84, 94 (the displacement-regulating portions 84*c*, 94*c*).

As a result, it is possible to render it easier for the elastic partition membrane 210 to do a reciprocating displacement, thereby facilitating more its submissive deformation in response to the hydraulic pressure fluctuatons between the first and the second liquid chambers 6A, 6B, so that when a relatively small amplitude vibration is input, it is possible to absorb efficiently the hydraulic pressure difference between the first and the second liquid chambers 6A, 6B to obtain more securely a low dynamic spring characteristic.

In the case where the first and the second ribs 214, 215 impinge on the plate members 84, 94 despite the fact that in order to obtain a low dynamic spring characteristic, the top portions 214*a*, 215*a* are set in a height dimension so as to be spaced apart from the plate members 84, 94 in this manner, the top portions 214*a*, 215*a* serve as a cushion thereby enabling the first and the second ribs 214, 215 to impinge moderately on the plate members 84, 94, so that it is possible to achieve a great reduction of strange sounds by that amount.

In the foregoing embodiment, the inner periphery of the engine side bracket B2 is configured in a rectilinear shape in cross-section, but is not necessarily limited to this shape. Alternatively the inner periphery of the engine side bracket B2 may be formed with an abutment portion capable of abutting on the step portion of the second attachment fitting 2 internally press-fitted therein in such a manner that the abutment portion protrudes radially inwardly.

Figure 9:
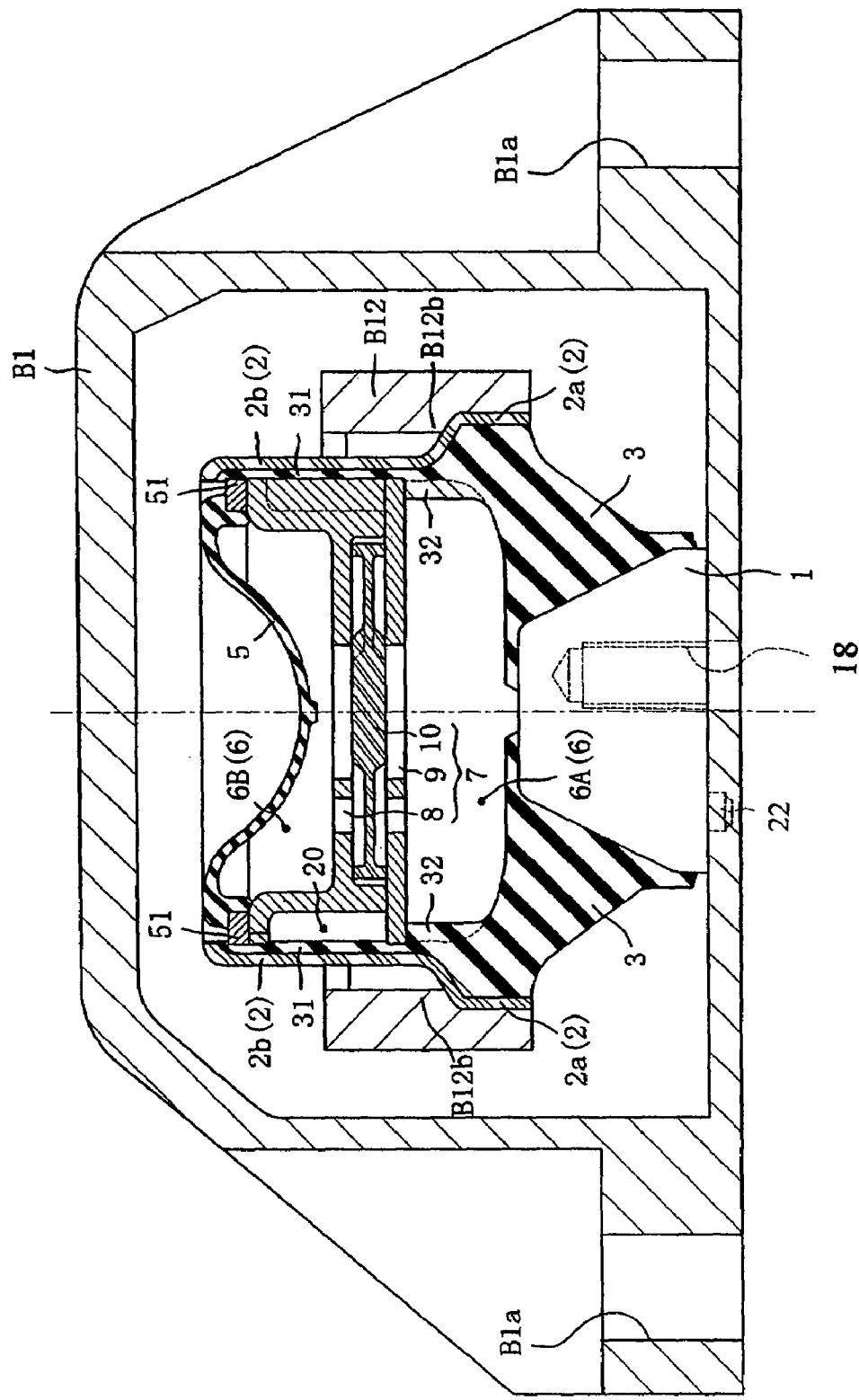
FIG. 9 is a sectional view of the hydraulic antivibration device in a modified example.

Another variation example of this constitution will be described with reference to FIG. 9. FIG. 9 is a sectional view of the hydraulic antivibration device 100 in the variation example and corresponds to the sectional view of the hydraulic antivibration device 100 taken along II-II line of FIG. 1(*a*). Like parts in the foregoing embodiment are designated by like reference numerals, and detailed explanation of them is omitted.

As illustrated in FIG. 9, at the inner periphery of the engine side bracket B12 an abutment portion B12*b* is formed to protrude radially inwardly. Thus when the second attachment fitting 2 is internally press-fitted in the inner periphery of the engine side bracket B12, the step portion is put into abutment on the abutment portion B12*b*, whereby it is possible to conduct the positioning of press-fitting direction.

The second attachment fitting 2 is constructed so that the large-diameter cylinder portion 2*a* may be situated on the first attachment fitting 1 side than the small-diameter cylinder portion 2*b*, and in the internal press-fitting state as shown in FIG. 9, the step portion of the second attachment fitting 2 may be situated on the first attachment fitting 1 side than the abutment portion B12*b* of the engine side bracket B12.

Because of that construction, in cases where the engine EG after supported and fixed displaces largely owing to irregularity of the travelling road surfaces and the engine side bracket B12 is displaced largely in the carrying load direction (the downward direction in FIG. 9) (namely, where the second attachment fitting 2 is displaced toward the first attachment fitting 1), the elastic recovery force of the compression-deformed vibration-isolating base 3 works as a force obstructing the movement of the second attachment fitting 2, and the second attachment fitting 2 becomes liable to be detached from the inner periphery of the engine side bracket B12. However, according to the hydraulic antivibration device 100 in this variation example, because the abutment portion B12*b* of the engine side bracket B12 is made to abut on the step portion of the second attachment fitting 2, such detachment of the second attachment fitting 2 from the inner periphery of the engine side bracket B12 can be avoided reliably.

Where the engine side bracket B12 is displaced in the opposite direction (upward direction in FIG. 9) to the carrying load (namely, the second attachment fitting 2 is displaced in a receding direction from the first attachment fitting 1), the elastic recover power of the compression-deformed vibration-isolating base 3 acts as power aiding in the movement of the second attachment fitting 2 and consequently, the second attachment fitting 2 is hard to be detached from the inner periphery of the engine side bracket B12. Therefore such a preventive means to detachment as described above is dispensed with.

In the foregoing embodiment, the description has been made of the case where the large-diameter cylinder portion 2a of the second attachment fitting 2 is internally press-fitted in the inner periphery of the engine side bracket B2, but the invention is not necessarily limited to this embodiment. Instead, it is possible to construct so that the small-diameter cylinder portion 2b of the second attachment fitting 2 may be internally press-fitted in the inner periphery of the engine side bracket B2.

In that case constructed in this manner, the step portion of the second attachment fitting 2 can be brought into abutment on the opening of the engine side bracket B2, and consequently, it is possible to conduct the positioning upon internal press-fitting and to obtain a detachment prevention effect, similarly to the case where the above-mentioned abutment portion B12b is provided.

In the foregoing embodiment, the description has been made of the case where the first and the second ribs 14, 15 of the elastic partition membrane 10 are arranged in a mutually superposed position when viewed in the axis center direction, but otherwise, the first ribs 14 may be arranged to be deviated in the circumferential direction from the second ribs 15 when viewed in the axis center direction.

This deviated arrangement is possible, for example, in the following way: In the foregoing example, the first and the second ribs 14, 15 are disposed at intervals of 45 degrees in the circumferential direction. Here, the position of the respective second ribs to be arranged is moved by 22.5 degrees relative to the position of the respective first ribs 14 to be arranged so that when viewed in the axis center direction, each of the second ribs 15 may be situated in the intermediate between the first ribs 14 mutually adjacent.

Thus for example, where the first ribs 14 are displaced toward the plate member 84, attended by the input of a relatively large amplitude vibration, in particular, after the first ribs 14 abut on the plate member 84, the second ribs 15 situated oppositely to the displacement direction of the first ribs act as a reinforcing member to regulate the displacement of the elastic partition membrane 10 (the thick-walled portion 11 and the thin-walled portion 12), which makes it difficult for the elastic partition membrane 10 to displace, thus enabling enhancement of the membrane stiffness by that amount. As a result, it is possible to exhibit more the fluidization effect of the fluid to obtain a high damping characteristic.

On the other hand, against the input of a relatively small amplitude vibration, the number of the first and second ribs 14, 15 disposed is not changed from the number in the foregoing embodiment, and consequently, a rise in stiffness of the entirety of the elastic partition membrane 10 is suppressed and a low dynamic spring characteristic can be maintained.

Although explanation was omitted in the foregoing embodiment, such a constitution is also possible that rubber-like elastomer is attached respectively to the inner peripheral face of the body frame side bracket B1 (inner peripheral face of a space accommodating the hydraulic antivibration device 100) and to the outer peripheral face of the engine side bracket B2 by vulcanization bonding, etc., thereby enabling regulation of the displacement so that a stopper action may be obtained upon inputting of a large displacement.

The invention claimed is:

1. A hydraulic antivibration device comprising:
a first attachment fitting,
a second cylindrical attachment fitting,
a vibration-isolating base joining the second attachment fitting and the first attachment fitting and composed of a first elastomer,
a diaphragm attached to the second attachment fitting and forming a liquid-filled chamber between the diaphragm and the vibration-isolating base, and
a partitioning means comparting the liquid-filled chamber into a first liquid chamber on the vibration-isolating base side and a second liquid chamber on the diaphragm side, and an orifice formed between an outer peripheral face of the partitioning means and an inner peripheral face of the second attachment fitting and putting the first liquid chamber and the second liquid chamber into communication with each other, the partitioning means including an elastic partition membrane composed of a second elastomer and a pair of displacement-regulating members regulating the displacement amount of the elastic partition membrane from both sides thereof, the pair of displacement-regulating members having respective openings;
wherein the openings consist of a first opening defined at a radially central location of each of the displacement-regulating members and a plurality of second openings defined around the first opening in a distributed manner;
wherein the elastic partition membrane includes;
a thick-walled portion at a radially central location thereof located within the first openings when viewed in an axis center direction thereof,
a thin-walled portion located radially outwardly of the thick-walled portion and formed to be thinner than the thick-walled portion thereby being located to be spaced apart from the pair of the displacement-regulating members,
a stationary portion situated in a peripheral marginal area of the thin-walled portion and pinched and fixed between the pair of the displacement-regulating members radially outwards of the second openings,
first ribs situated on a first face side of the thin-walled portion around the thick-walled portion in a distributed manner and formed integrally with a boundary between the thick-walled portion and the thin-walled portion in a spaced relation to the one of the pair of the displacement-regulating members, and
second ribs situated on a second face side of the thin-walled portion around the thick-walled portion in a distributed manner and formed integrally with the boundary between the thick-walled portion and the thin-walled portion in a spaced relation to the other of the pair of the displacement-regulating members; and
wherein the first attachment fitting is constructed as a body frame side coupling means to be coupled to a body frame side and the second attachment fitting is constructed as a vibration generator side coupling means to be coupled to a vibration generator side, and thereby, part of a vibration transmitting path from the partitioning means to a body frame is constituted by the vibration-isolating base.

2. The hydraulic antivibration device as set forth in claim 1, wherein the first and the second ribs are disposed, when viewed in an axis center direction of the elastic partition membrane, in a radial fashion relative to an axis center and equidistantly in the circumferential direction.

3. The hydraulic antivibration device as set forth in claim 1 or 2, wherein the first and the second ribs have respective top portions on their opposing faces to the pair of the displacement-regulating members in a projecting manner and the top portions are set in such a height dimension that upon assembling of the partitioning means, the top portions are situated in a spaced relation to the pair of the displacement-regulating members.

4. The hydraulic antivibration device as set forth in claim 1 or 2, wherein the first and the second ribs have respective top portions on their opposing faces to the pair of the displacement-regulating members in a projecting manner and the top portions are set in such a height dimension that upon assembling of the partitioning means, the top portions abuts the pair of the displacement-regulating members.

5. The hydraulic antivibration device as set forth in claim 1 or 2, wherein on at least one face side of the thin-walled portion, auxiliary ribs are formed in a space between where the first or the second ribs are formed, and the auxiliary ribs are constructed to be lower in rib height and narrower in rib width than at least the first or the second ribs.

6. A hydraulic antivibration assembly containing the hydraulic antivibration device as set forth in claim 1 or 2 and a vibration generator side bracket coupling the hydraulic antivibration device to the vibration generator side bracket, wherein the second attachment fitting includes a small-diameter cylinder portion, a large-diameter cylinder portion formed to be larger in diameter than the small-diameter cylinder portion, and a step portion linking the large-diameter cylinder portion and the small-diameter cylinder portion, the large-diameter cylinder portion being internally press-fitted in the inner periphery of the vibration generator side bracket; and wherein the vibration generator side bracket is formed on its inner periphery with an abutment portion protruding radially inwardly that is capable of abutting on the step portion of the second attachment fitting internally press-fitted in the inner periphery.

7. The hydraulic antivibration assembly as set forth in claim 6, wherein the second attachment fitting is constructed so that the large-diameter cylinder portion is situated closer to the first attachment fitting side than the small-diameter attachment fitting, and internally press-fitted in the inner periphery of the vibration generator side bracket, and wherein the step portion of the second attachment fitting in the internally press-fitted state is situated closer to the first attachment fitting side than the abutment portion of the vibration generator side bracket.

* * * * *